(12) United States Patent
Tagawa et al.

(10) Patent No.: US 9,114,803 B2
(45) Date of Patent: Aug. 25, 2015

(54) DRIVE CONTROL APPARATUS FOR PROVIDING DRIVE CONTROL TO A HYBRID ELECTRIC VEHICLE, AND HYBRID ELECTRIC VEHICLE

(75) Inventors: Masaaki Tagawa, Shizuoka (JP); Yoshiki Ito, Shizuoka (JP); Masakazu Saito, Shizuoka (JP); Hitoshi Ohkuma, Shizuoka (JP); Yukihiro Hosoe, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 13/982,643

(22) PCT Filed: Feb. 3, 2011

(86) PCT No.: PCT/JP2011/000619
§ 371 (c)(1),
(2), (4) Date: Jul. 30, 2013

(87) PCT Pub. No.: WO2012/104922
PCT Pub. Date: Aug. 9, 2012

(65) Prior Publication Data
US 2013/0311024 A1 Nov. 21, 2013

(51) Int. Cl.
*B60W 20/00* (2006.01)
*B60W 10/06* (2006.01)
(Continued)

(52) U.S. Cl.
CPC .............. *B60W 20/10* (2013.01); *B60K 6/445* (2013.01); *B60W 10/06* (2013.01); *B60W 10/08* (2013.01);
(Continued)

(58) Field of Classification Search
CPC ...... B60W 20/00; B60W 10/06; B60W 10/08
See application file for complete search history.

(56) References Cited

U.S. PATENT DOCUMENTS

| | | | | |
|---|---|---|---|---|
| 4,034,725 | A | * | 7/1977 | Ito et al. .................... 123/356 |
| 2002/0115526 | A1 | * | 8/2002 | Wakashiro et al. ............ 477/5 |

(Continued)

FOREIGN PATENT DOCUMENTS

| | | |
|---|---|---|
| JP | 2003-39990 A | 2/2003 |
| JP | 2007-296937 A | 11/2007 |

(Continued)

OTHER PUBLICATIONS

International Search Report mailed Apr. 19, 2011 in PCT/JP2011/000619.
The First Office Action mailed Apr. 17, 2015 in corresponding Chinese Patent Application No. 201180066806.5 (with an English translation) (12 pages).

*Primary Examiner* — Calvin Cheung
*Assistant Examiner* — Martin Weeks
(74) *Attorney, Agent, or Firm* — Rothwell, Figg, Ernst & Manbeck, P.C.

(57) ABSTRACT

An engine, a first motor generator and a second motor generator are controlled by calculating an engine power target from a driving power target required for a vehicle, and finding a target engine operating point expressed by a set of an engine speed target and an engine torque target on a target operating line determined in response to the engine power target. When the found target engine operating point is different from the previously found one, a change in engine speed target is limited to a predetermined amount of change and the engine torque target of the set is reset versus an engine speed target involving the limited change based on the determined target operating line. Consequently, the engine power target and thus the driving power target are ensured so as to restrain or prevent sudden or frequent changes in engine speed with the efficiency kept high.

4 Claims, 15 Drawing Sheets

(51) Int. Cl.
*B60W 10/08* (2006.01)
*B60K 6/445* (2007.10)
*B60W 30/188* (2012.01)
*F16H 37/10* (2006.01)

(52) U.S. Cl.
CPC ........... *B60W 20/00* (2013.01); *B60W 30/1882* (2013.01); *B60W 2510/0666* (2013.01); *B60W 2600/00* (2013.01); *B60W 2710/0644* (2013.01); *B60W 2710/0677* (2013.01); *F16H 2037/102* (2013.01); *Y02T 10/6239* (2013.01); *Y10S 903/93* (2013.01)

(56) References Cited

U.S. PATENT DOCUMENTS

| | | | |
|---|---|---|---|
| 2006/0199696 A1* | 9/2006 | Gouda et al. | 477/3 |
| 2009/0209381 A1* | 8/2009 | Ai et al. | 475/5 |
| 2009/0210108 A1* | 8/2009 | Okubo et al. | 701/22 |

FOREIGN PATENT DOCUMENTS

| | | |
|---|---|---|
| JP | 2008-12992 A | 1/2008 |
| JP | 2009-6841 A | 1/2009 |
| JP | 2010-158979 A | 7/2010 |

* cited by examiner

DRIVE CONTROL APPARATUS FOR PROVIDING DRIVE CONTROL TO A HYBRID ELECTRIC VEHICLE, AND HYBRID ELECTRIC VEHICLE

CROSS REFERENCE TO RELATED APPLICATION

This application is a 35 U.S.C. 371 National Phase Entry Application from PCT/JP2011/000619, filed Feb. 3, 2011, the disclosure of which is incorporated herein in its entirety by reference.

TECHNICAL FIELD

The present invention relates to a drive control apparatus for a hybrid electric vehicle including, as power sources, an engine and an electric motor and a hybrid electric vehicle, and particularly to a drive control apparatus suitable for controlling a plurality of power sources so as to maintain a drive torque at a given target.

BACKGROUND ART

For example, Patent Literature 1 listed below describes one of hybrid electric vehicles including an electric motor, as another power source, other than an engine. In the hybrid electric vehicle disclosed in this Patent Literature 1, when an engine speed target that is a target value of engine speed and an engine torque target that is a target value of engine torque are the coordinates of each of engine operating point targets, interconnecting efficient engine operating point targets in succession to provide target operating line (s) and mapped, and an improvement of fuel efficiency is made by operating the engine at engine speed targets and engine torque targets on the target operating line(s).

PRIOR ART

Patent Literature

Patent Literature 1: JP-A 2008-12992

SUMMARY OF INVENTION

Problem to be Solved by Invention

However, sudden or frequent changes in engine speed caused by changes in engine operating point target is annoying. Reducing the magnitude of change in engine speed target after setting an engine speed target and an engine torque target on a target operating line might be effective to restrain or prevent sudden or frequent changes in engine speed, but, even if sudden or frequent changes would be restrained, it might cause a deterioration in fuel efficiency due to deviation of the achieved engine torque from said efficient target operating line.

With focus on the above-mentioned problems, an object of the present invention is to provide a drive control apparatus for providing drive control to a hybrid electric vehicle and a hybrid electric vehicle, which are efficient while restraining or preventing sudden or frequent changes in engine speed.

Means to Solve Problem

In order to solve the above-mentioned problem, there is provided, according to one implementation of the present invention, a drive control apparatus for a hybrid electric vehicle, which is driven by using the output of an engine and the output of an electric motor operable on power supplied by a battery, characterized by comprising: a drive control function configured to control operation of said engine and electric motor; and in that said drive control function includes an engine control function configured to limit a change in engine speed target to a predetermined amount of change upon making a change in engine speed target and set an engine torque target versus an engine speed target involving the limited change based on a target operating line determined beforehand.

Further, said drive control function includes an engine power target setting function configured to calculate an engine power target from a driving power target required for the vehicle; and said engine control function finds a target engine operating point, which is expressed by a set of an engine speed target and an engine torque target, on said target operating line determined in response to said engine power target, limits a change in engine speed target to a predetermined amount of change when said target engine operating point is different from the previously found target engine operating point and resets the engine torque target of the set versus an engine speed target involving the limited change based on said determined target operating line.

Furthermore, there is provided a power split and composition system with four shafts in driving connection with rotating elements of each of two planetary gear sets; said electric motor and another electric motor are coupled to the battery; and said four shafts of the power split and composition system are connected to said another electric motor, said engine, a traction shaft connected to a traction wheel and said motor, respectively, so that said another electric motor, said engine, said traction shaft and said electric motor are arranged in this order on a collinear diagram from one side thereof; and said drive control function controls operation of said engine in response to said engine power target and controls operation of said electric motor and that of said another electric motor in response to a charge/discharge power target given by subtracting the engine power target from said driving power target.

Effect of Invention

According to the embodiment of the present invention, operations of the engine, first motor generator and second motor generator are controlled by limiting a change in engine speed target to a predetermined amount of change upon making a change in engine speed target and setting an engine torque target versus an engine speed target involving the limited change based on a target operating line determined beforehand. Consequently, this restrains or prevents sudden or frequent changes in engine speed with the efficiency kept high.

Moreover, an engine power target is calculated from a driving power target required for a vehicle, and a target engine operating point expressed by a set of an engine speed target and an engine torque target is found on a target operating line determined in response to the engine power target. When the found target engine operating point is different from the previously found target engine operating point, a change in engine speed target is limited to a predetermined amount of change and the engine torque target of the set is reset versus an engine speed target involving the limited change based on the determined target operating line. Consequently, the engine power target and thus the driving power target are ensured so as to restrain or prevent sudden or frequent changes in engine speed with the efficiency kept high.

Furthermore, there is provided a power split and composition system with four shafts in driving connection with rotating elements of each of two planetary gear sets. The motor and another electric motor are coupled to the battery. The four shafts of the power split and composition system are connected to another electric motor, engine, traction shaft connected to a traction wheel and motor, respectively, so that the another electric motor, engine, traction shaft and motor are arranged in this order on a collinear diagram from one side thereof. The engine is controlled in response to said engine power target, while the electric motor and another electric motor are controlled in response to a charge/discharge power target given by subtracting the engine power target from the driving power target. Accordingly, a simple and compact hybrid system with high efficiency and few losses can be realized.

DESCRIPTION OF EMBODIMENT(S)

Referring, next, to the drawings, one embodiment of a drive control apparatus for providing a drive control to a hybrid electric vehicle according to the present invention is described.

Figure 1:
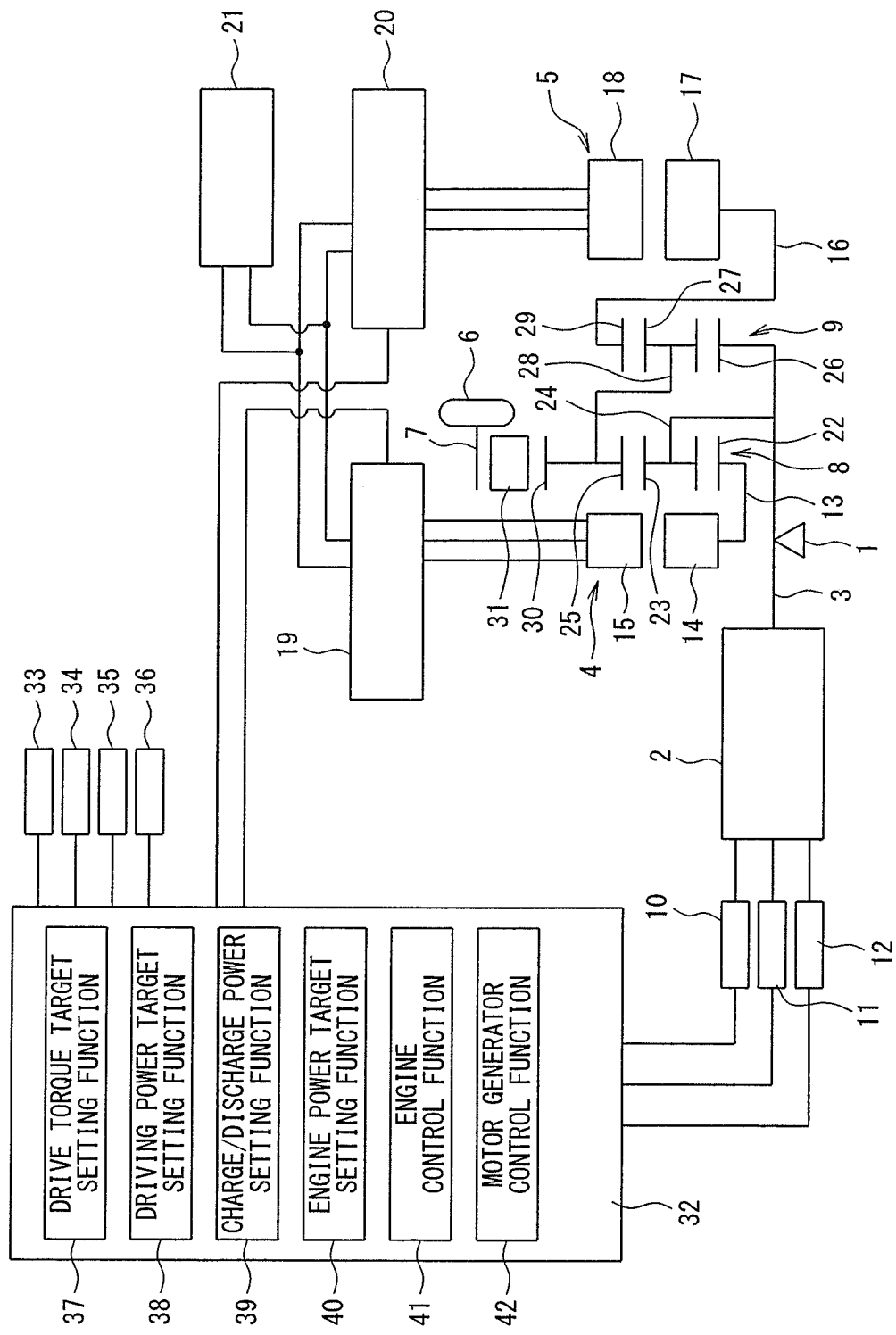
FIG. 1 is a system configuration diagram, showing one embodiment of a drive control apparatus for providing drive control to a hybrid electric vehicle according to the present invention.

FIG. 1 shows a system configuration diagram showing the embodiment of drive control apparatus for providing drive control to a hybrid electric vehicle according to the present invention. The hybrid electric vehicle according to this embodiment includes, as its powertrain, an engine 2 configured to deliver engine power by providing internal combustion of fuel, a first motor generator (or a motor) 4 and a second motor generator (or a motor) 5, each being configured to deliver power by receiving electric energy (in a motor drive mode) or generate electric energy in a regenerative mode, a traction shaft 7 connected to a traction wheel 6 of the vehicle, a first planetary gear set 8 and a second planetary gear set 9, which provide a power split and composition system that composes or splits driving power delivered from said engine 2, the first and second motor generators 4 and 5 and the ground reaction that is delivered from the traction wheels 6, and an output gearing 31 that provides a drive connection between the power split and composition system and the traction shaft 7.

Engine 2 includes: amass air flow adjustment unit 10, like a throttle valve, configured to adjust conditions of intake air in response to the position of an accelerator pedal that is not illustrated; a fuel admission system 11, like a fuel injection system, configured to adjust conditions of admission of fuel in response to the conditions of intake air; and an ignition manager 12, like an ignition system, configured to adjust conditions of igniting fuel. Accordingly, combustion of fuel in engine 2 may be controlled by coordinating the conditions of intake air by operating the mass air flow adjustment unit 10, conditions of injection fuel by operating the fuel admission system 11 and conditions of igniting fuel by the operating ignition manager 12, resulting in modulation of engine power from the engine 2, specifically modulation of rotational speed and torque, which may be hereinafter described also as engine speed and engine torque. A one-way clutch 1 is provided, as an engine rotation restriction mechanism, to allow the engine output shaft 3 of the engine 2 to rotate in one direction only and regulate its rotation in the opposite direction.

First motor generator 4 has a first rotor shaft 13, a first rotor 14 and a first stator 15. Second motor generator 5 has a second rotor shaft 16, a second rotor 17 and a second stator 18. First stator 15 of first motor generator 4 is electrically coupled to a first inverter 19, and second stator 18 of second motor generator 5 is electrically coupled to a second inverter 20. First and second inverters 19 and 20 are electrically coupled to a battery 21. First and second inverters 19 and 20 adjust electrical energy delivered from the battery 21 to first and second stators 15 and 18 via adjusting, for example, field current so as to adjust motor power from first motor generator 4 and motor power from second motor generator 5, specifically, rotational speed and driving torque (which may be hereinafter described also as motor-generator rotational speed and motor-generator torque). Moreover, each of first and second motor generators 4 and 5 is operable in regenerative mode to generate electricity when torque is directed in a direction opposite to a direction of rotation, so that the generated electrical energy may be used to charge the battery 21.

First planetary gear set 8, as is well known in the art, includes a first sun gear 22, a first carrier 24, which carries first planetary gears 23, and a first ring gear 25. Second planetary gear set 9 includes a second sun gear 26, a second carrier 28, which carries second planetary gears 27, and a second ring gear 29. In this embodiment, the engine 2, first motor generator 4, second motor generator 5, first planetary gear set 8 and second planetary gear set 9 are all disposed on the same axis. First carrier 24 of first planetary gear set 8 and second sun gear 26 of second planetary gear set 9 are coupled together and connected drivably to the engine output shaft 3 of engine 2. First sun gear 22 of first planetary gear set 8 is connected drivably to first rotor shaft 13 of first motor generator 4. Second ring gear 29 of second planetary gear set 9 is connected drivably to second rotor shaft 16 of second motor generator 5. First ring gear 25 of first planetary gear set 8 and second carrier 28 of second planetary gear set 9 are coupled together and connected to traction shaft 7 for traction wheel 6. Drive connection to traction shaft 7 is accomplished by connecting an output portion 30 such as a gear formed on the outer circumference of first ring gear 25 of first planetary gear set 8 to traction shaft 7 with output gearing 31. Drive connection of each of a portion of rotating elements of first planetary gear set 8 to the corresponding one of rotating elements of second planetary gear set 9 is accomplished directly without any power transmitting gear between them, and drive connection of each of the remainder of the rotating elements to the corresponding one of first motor generator 4, second motor generator 5 and engine 2 is accomplished similarly.

Mass air flow adjustment unit 10 to adjust conditions of intake air entering said engine 2, fuel admission system 11 to adjust conditions of admission of fuel, ignition manager 12 to adjust conditions of igniting fuel, first inverter 19 to adjust electrical energy to first stator 15 of first motor generator 4, second inverter 20 to adjust electrical energy to second stator 18 of second motor generator 5 are connected to drive-control controller (drive control function) 32. The drive-control controller 32 is composed of: a drive torque target setting function 37 to set drive torque needed for propelling the vehicle; a driving power target setting function 38 to set a driving power target to obtain drive torque with the vehicle travelling at a vehicle speed; a charge/discharge power target setting function 39 to set a charge/discharge power to said battery 21 judging from the state of charge of battery 21; an engine power target setting function 40 to set an engine power target to obtain a driving power target while achieving the charge/discharge power target; an engine control function 41 to set an efficient engine speed and engine torque in response to the engine power target; and a motor generator control function to control first inverter 19 and second inverter 20 as the total electricity of first motor generator 4 and second motor generator 5 becomes the charge/discharge power target. The drive-control controller 32 is composed of processor controllers like microcomputers, and said setting functions and control functions are operated by data processing performed in said drive-control controller 32.

The vehicle includes: an accelerator pedal position sensor 33 configured to detect the position of an accelerator pedal as an accelerator position Acc; a driving speed sensor 34 configured to detect a vehicle speed Vc; an engine speed sensor 35 configured to detect the rotational speed of the engine 2 as an engine speed Neng; and a battery state of charge sensor 36 configured to detect the amount of electrical energy SOC in the battery 21. The drive-control controller 32 reads the detected signals from these sensors and controls operating conditions of engine 2, first motor generator 4 and second motor generator 5 by coordinating mass air flow adjustment unit 10, fuel admission system 11, ignition manager 12, and first and second inverters 19 and 20 in accordance with processing described later.

As described before, according to the present embodiment, first carrier 24 of first planetary gear set 8 and second sun gear 26 of second planetary gear set 9 are directly coupled together, and first ring gear 25 of first planetary gear set 8 and second carrier 28 of second planetary gear set 9 are directly coupled together. Therefore, first carrier 24 and second sun gear 26 turn at the same speed on collinear diagrams for two planetary gear sets 8 and 9, and first ring gear 25 and second carrier 28 turn at the same speed, too. Now, overlaying the two collinear diagrams for planetary gear sets 8 and 9 makes a collinear diagram, shown in FIG. 2, which has four vertical axes in total as four rotating elements, that is, from the left, an axis for first sun gear 22 of first planetary gear set 8 (an axis labeled "MG1" in FIG. 2: the first sun gear 22 being equivalent to first rotor shaft 13 of first motor generator 4), an axis for first carrier 24 of first planetary gear set 8 and second sun gear 26 of second planetary gear set 9 (an axis labeled "ENG" in FIG. 2: the first carrier 24 and second sun gear 26 being equivalent to the engine output shaft 3 of engine 2), an axis for first ring gear 25 of first planetary gear set 8 and second carrier 28 of second planetary gear set 9 (an axis labeled "OUT" in FIG. 2: first ring gear 25 and second carrier 28 being equivalent to output portion 30 of first ring gear 25, i.e. the traction shaft 7 of traction wheels 6), and an axis for second ring gear 29 of second planetary gear set 9 (an axis labeled "MG2" in FIG. 2: the second ring gear 29 being equivalent to second rotor shaft 16 of second motor generator 5). Then, a lever ratio indicative of the relation among the distances, each between the adjacent two of the vertical axes is found: assuming that the distance between the axes ENG and OUT is 1, the distance between the axes ENG and MG1 takes on the value k1 which results from dividing the number of teeth of first ring gear 25 of first planetary gear set 8 by the number of teeth of first sun gear 22, the distance between the axes OUT and MG2 takes on the value k2 which results from dividing the number of teeth of second sun gear 26 of second planetary gear set 9 by the number of teeth of second ring gear 29.

This collinear diagram for the power split and composition system is equivalent to what is previously proposed by the present applicant in JP Patent No. 3852562. The characteristic of the power split and composition system is that the first motor generator 4 and the second motor generator 5 are located on one and the other points where the remotest two of the four vertical axes are. The relation in which the first and second motor generators 4 and 5 are placed on where the remotest two of the four vertical axes are provides not only, as mentioned in above-mentioned JP Patent, a configuration free from disadvantages such as an increase in number of parts, an increase in size of system, an increase of mechanical loss and so forth, but also, as will be described later, a reduction in the magnitude of an exchange of electrical energy during driving in ordinary situations with a high gear ratio, which in turn improves fuel efficiency.

Hereinafter, referring to several collinear diagrams, relations between speed and torque of the engine 2, travelling speed of the vehicle, speed and torque of the first and second motor generator 4 and 5 are described. In each of the collinear diagrams, Tmg1 is the first motor-generator torque provided by first rotor shaft 13 of first motor generator 4, Tmg2 is the second motor-generator torque by second rotor shaft 16 of second motor generator 5, Teng is the engine torque by the engine output shaft 3 of engine 2, Tout is the output drive torque from the output portion 30, i.e. the drive torque delivered to the traction shaft 7. In each of the collinear diagrams, it is defined that the rotational speed has a positive direction when the direction is the same as that of the engine 2 and the torque, as an input along each of the four axes, has a positive direction when the direction is the same as that of the engine torque Teng. Therefore, the drive torque Tout from the output portion 30 moves the vehicle backward when it has a positive direction and forward when it has a negative direction. It is hereinafter assumed that no mechanical, electrical and physical losses take place in the following description.

Figure 2:
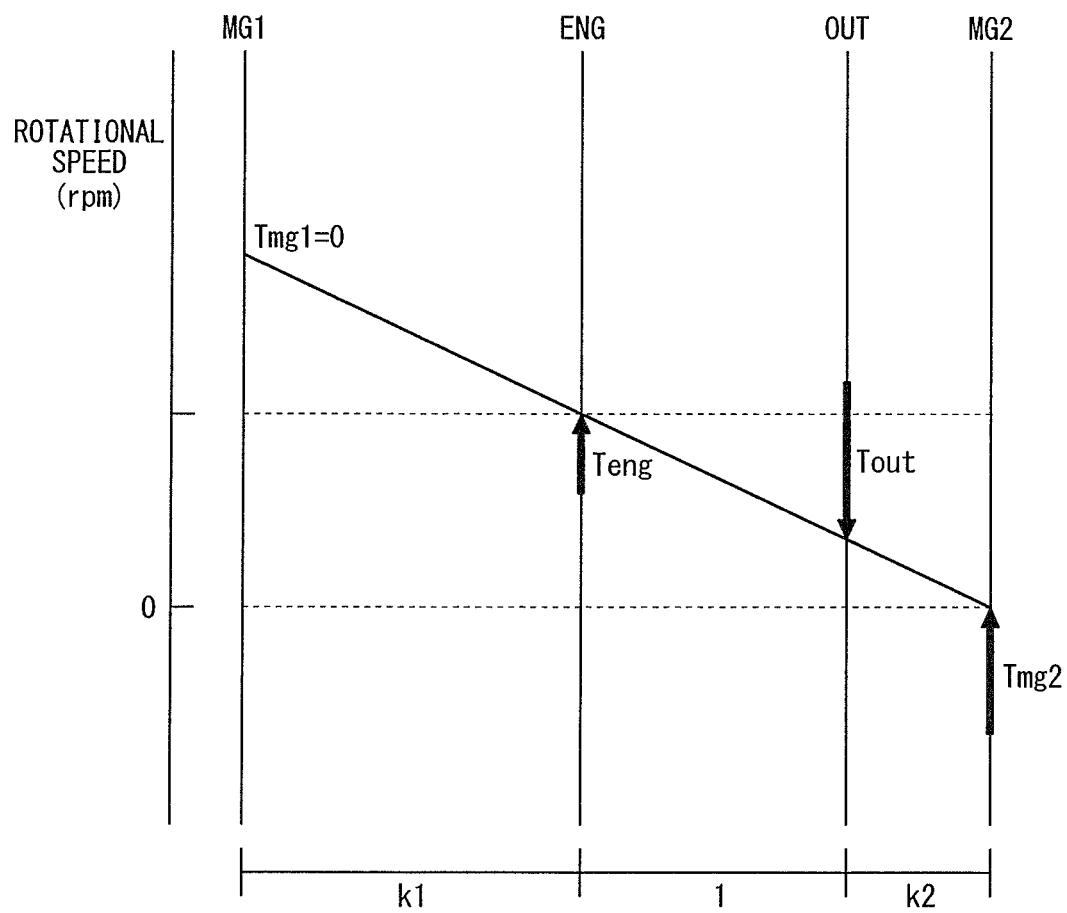
FIG. 2 is a collinear diagram for a power split and composition system in FIG. 1.

FIG. 2 represents a low-speed drive state in which the vehicle speed Vc is relatively low and the engine (ENG) 2 turns in a positive rotational direction to provide a positive engine torque Teng. Although first motor generator (MG1) 4 turns in the positive rotational direction at a high speed, the first motor-generator torque Tmg1 remains 0. Although second motor generator (MG2) 5 provides a positive second motor-generator torque Tmg2, second motor generator (MG2) 5 does not consume electrical power because the second motor-generator rotational speed Nmg2 is 0 (operation out of motoring mode). In this case, since a ratio of engine speed Neng of the engine 2 to rotational speed of the output portion 30, i.e., vehicle speed Vc, called "a gear ratio," is expressed as (1+k2)/k2, a state of low gear ratio is established because the transmission ratio is greater than 1.

Figure 3:
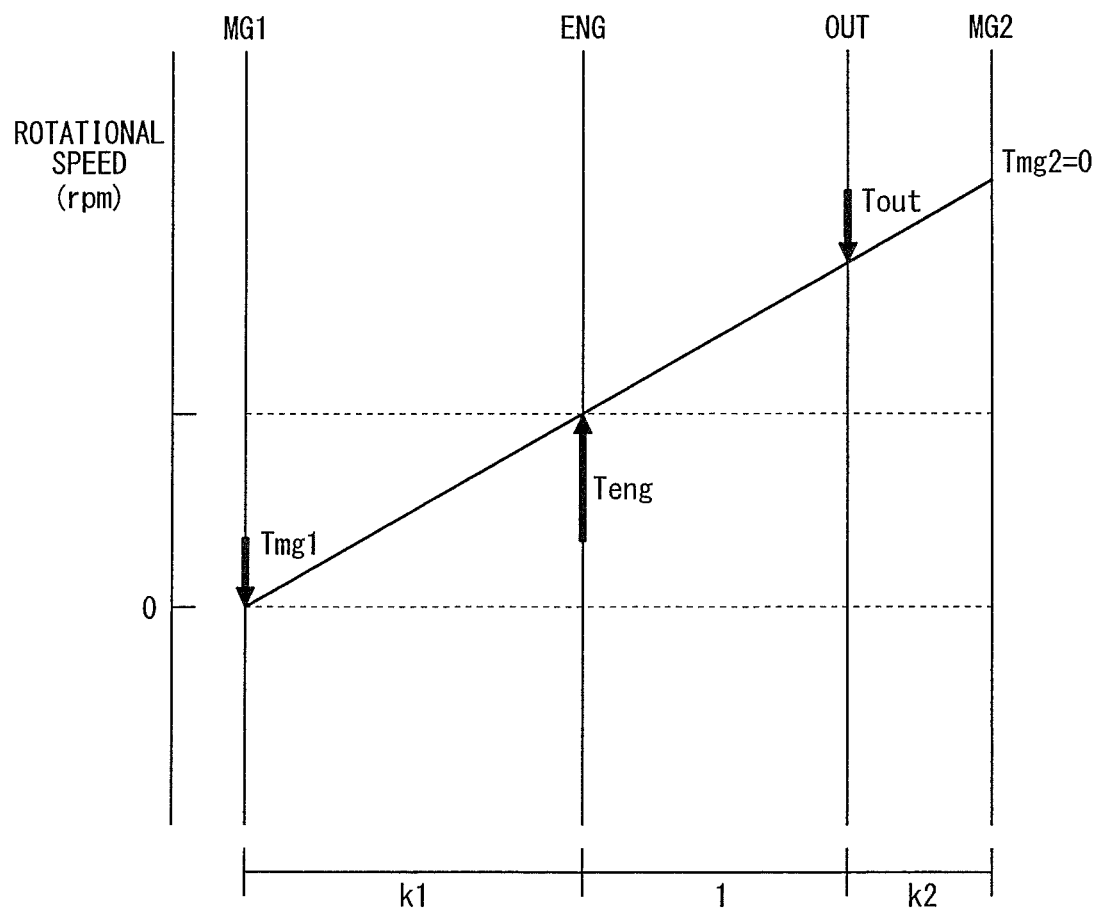
FIG. 3 is a collinear diagram for the power split and composition system in FIG. 1.

FIG. 3 represents a high-speed drive state in which the vehicle speed Vc is relatively high and the engine 2 turns in the positive rotational direction to provide a positive engine torque Teng. Although first motor generator (MG1) 4 provides a negative first motor-generator torque Tmg1, first motor-generator (MG1) 4 does not generate electrical power because the first motor-generator rotational speed Nmg1 is 0 (operation out of regenerating mode). Although second motor generator (MG2) 5 turns in the positive rotational direction at a high speed, the second motor-generator torque Tmg2 remains 0. In this case, since a ratio of engine speed Neng of the engine 2 to rotational speed of the output portion 30, i.e., vehicle speed Vc, called "a gear ratio," is expressed as k1/(1+k1), a state of high gear ratio is established because the transmission ratio is less than 1.

Figure 4:
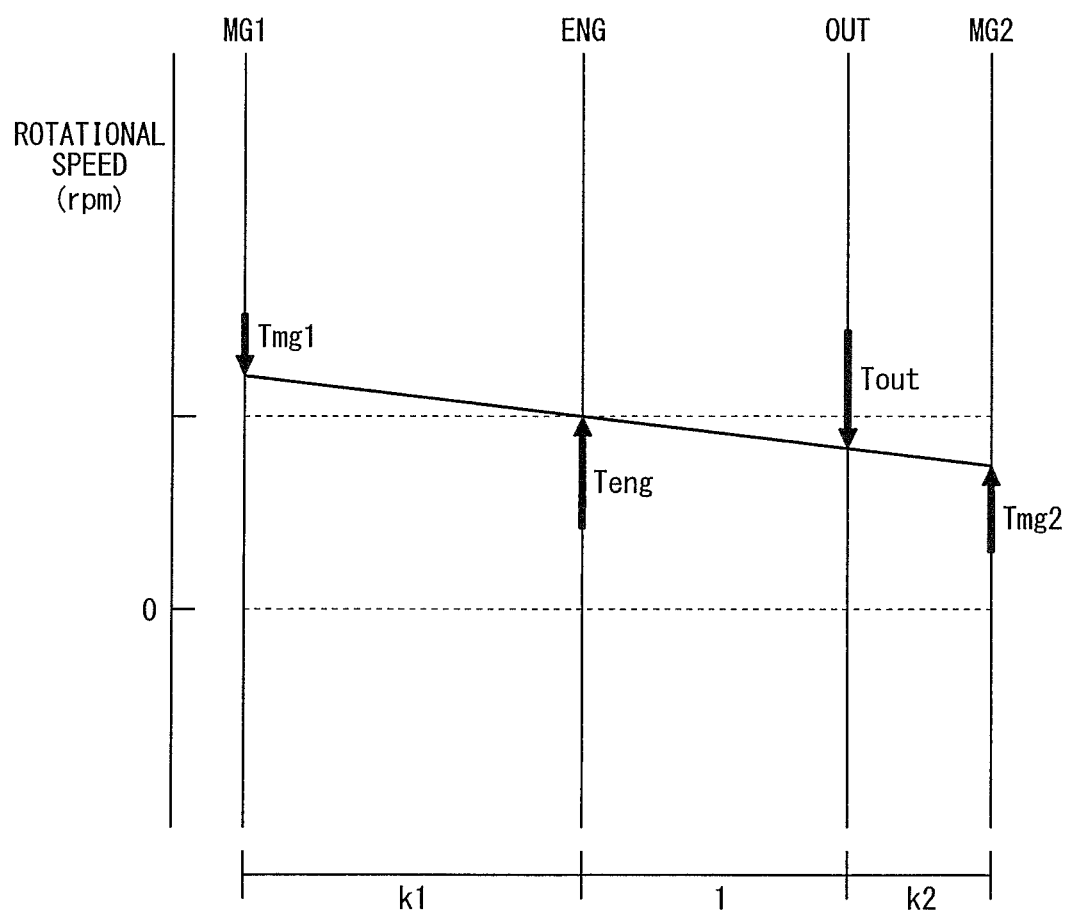
FIG. 4 is a collinear diagram for the power split and composition system in FIG. 1.

FIG. 4 represents, for example, in the illustrated state, a middle-speed drive state, which corresponds to a state of intermediate gear ratio between the low gear ratio state of FIG. 2 and high gear ratio state of FIG. 3, in which the vehicle speed Vc is middle and the engine 2 turns in a positive rotational direction to provide a positive engine torque Teng. First motor generator 4 turns in a positive rotational direction to provide a negative first motor-generator torque Tmg1. First motor generator 4 in fact generates electrical power (operation in generating mode). On the other hand, second motor generator 5 generates a positive second motor-generator torque Tmg2 though it turns in a positive rotational direction. Second motor generator 5 in fact is consuming electrical power (operation in motoring mode). When there is no charge to or discharge from the battery 21, an exchange of electrical energy may be nicely balanced by powering second motor generator 5 with electrical power generated by first motor generator 4.

Thus, it is possible for the power split and composition system according to the present embodiment to provide a suitable drive torque Tout to any one of various operating conditions of the engine by controlling the first and second motor generators 4 and 5 over a wide speed range from low speed to high speed. In principle, the hybrid electric vehicle according to this embodiment in fact does not need any transmission. Moreover, it is possible to drive the vehicle backward even when the engine 2 keeps running. It is also possible to drive the vehicle forward or backward when the engine 2 is shutdown by only both or one of first motor generator 4 and second motor generator 5.

Figure 5:
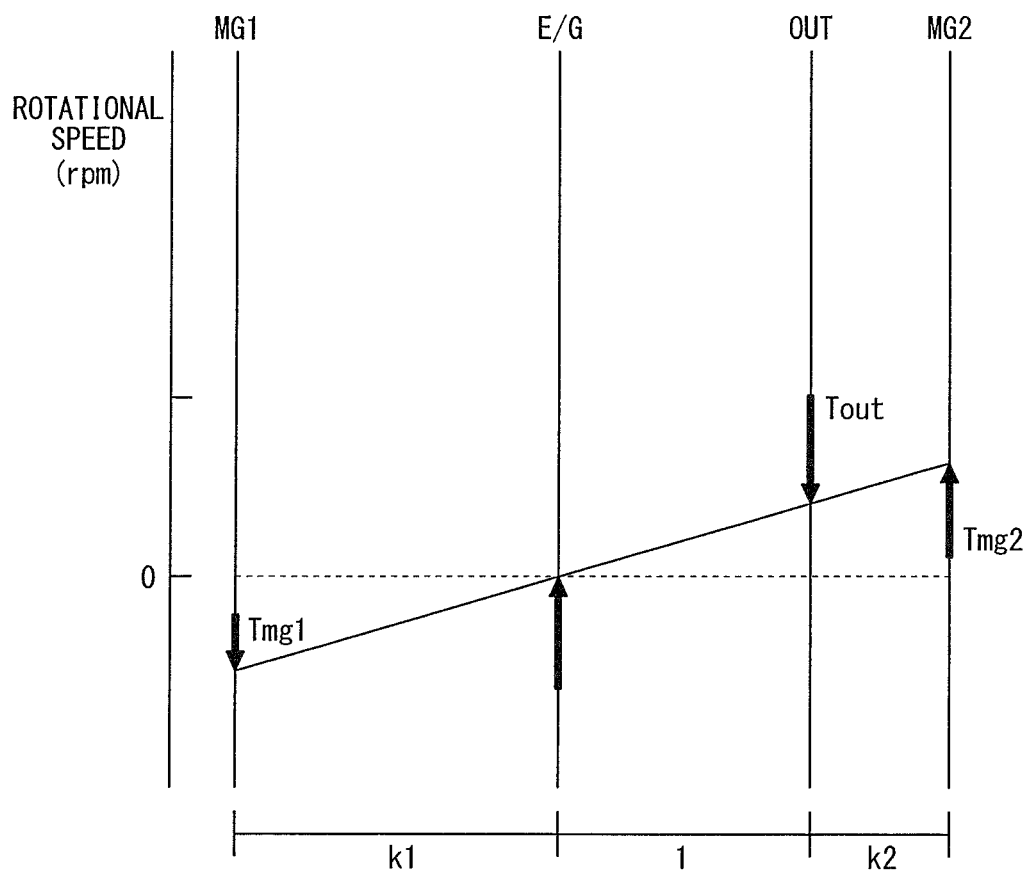
FIG. 5 is a collinear diagram for the power split and composition system in FIG. 1.
Figure 6:
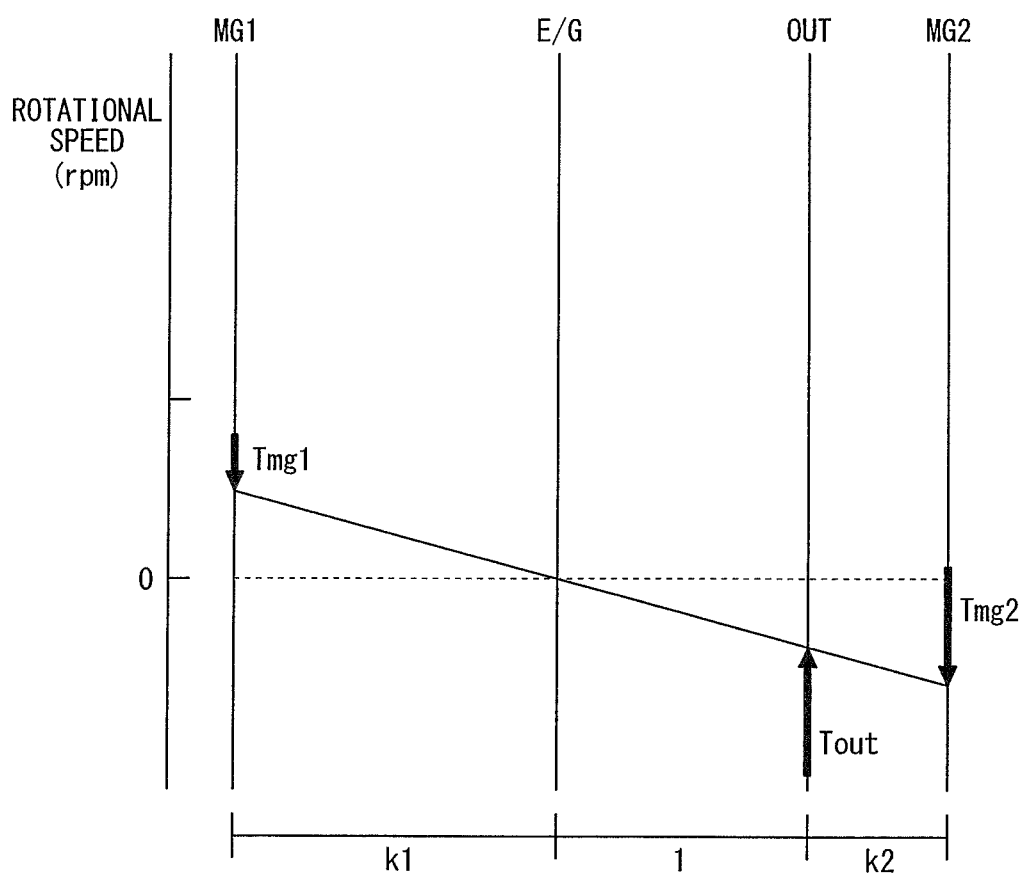
FIG. 6 is a collinear diagram for the power split and composition system in FIG. 1.

FIG. 5 is a collinear diagram representing forward driving of the vehicle when engine 2 stops by operating only one or both of first and second motor generators 4 and 5. In this case, as JP Patent No. 3852562 describes, the rotational speed of engine 2 should remain 0 so that if torque is imparted to the engine output shaft 3 in the negative direction, this torque would be received by a one-way clutch 1. FIG. 6 is a collinear diagram representing backward driving of the vehicle when engine 2 stops by operating only one or both of first and second motor generators 4 and 5. During forward or backward driving by operating only one or both of first and second motor generators 4 and 5, basically operating second motor generator 5 only may provide a sufficient drive torque for forward or backward driving because engine speed Neng is 0. However, as characteristic of a motor, torque reduces at high vehicle speeds, in this case, as the motor speed increases so that there are cases where a predetermined torque level may not be reached due to reverse electromotive force. Moreover, there are cases where the vehicle may resonate due to cogging torque at extremely low vehicle speeds when the vehicle is about to stop if the vehicle is driven only by the motor generator. Therefore, the first motor generator sharing ratio "cf" is set in response to driving conditions of the vehicle and rotational speed of second motor generator 5 (second motor generator rotational speed target Nmg2t) as described later, and torque of first motor generator 4 and torque of second motor generator 5 are set and controlled in response to the first motor generator sharing ratio "cf".

As is clear from these collinear diagrams, first motor generator rotational speed Nmg1 is derived from the following formula 1 and second motor generator rotational speed Nmg2 is derived from the following formula 2. In each of the formulas, Neng is the engine speed, and Nout is the output rotational speed of output portion 30, in which the output rotational speed Nout is derived from the vehicle speed Vc, the final reduction ratio and the reduction ratio of output gearing 31.

$$Nmg1 = (Neng - Nout) \times k1 + Neng \tag{1}$$

$$Nmg2 = (Nout - Neng) \times k2 + Nout \tag{2}$$

Input torques to the planetary gear sets are balanced when the following equation (3) holds. Electrical power generated or consumed by first and second motor generators 4 and 5 is equal to input/output electrical power (charge/discharge power) Pbat to/from battery 21 when the following equation (4) holds. Rotational speeds Nmg1 and Nmg2 are indicated in rpm (revolution per minute or rotation per minute).

$$Teng + (1+k1) \times Tmg1 = k2 \times Tmg2 \tag{3}$$

$$Nmg1 \times Tmg1 \times 2\pi/60 + Nmg2 \times Tmg2 \times 2\pi/60 = Pbat \tag{4}$$

As later described, a method is described for setting engine speed target Nengt and engine torque target Tengt which are considered to provide efficient operation. In the present embodiment, as described in JP-A 2008-12992 in which the applicant previously made a proposal, the setting is such that, for a given engine power request, the higher the vehicle speed, the higher the engine speed target Nengt becomes and the lower the engine torque target Tengt becomes.

Figure 7:
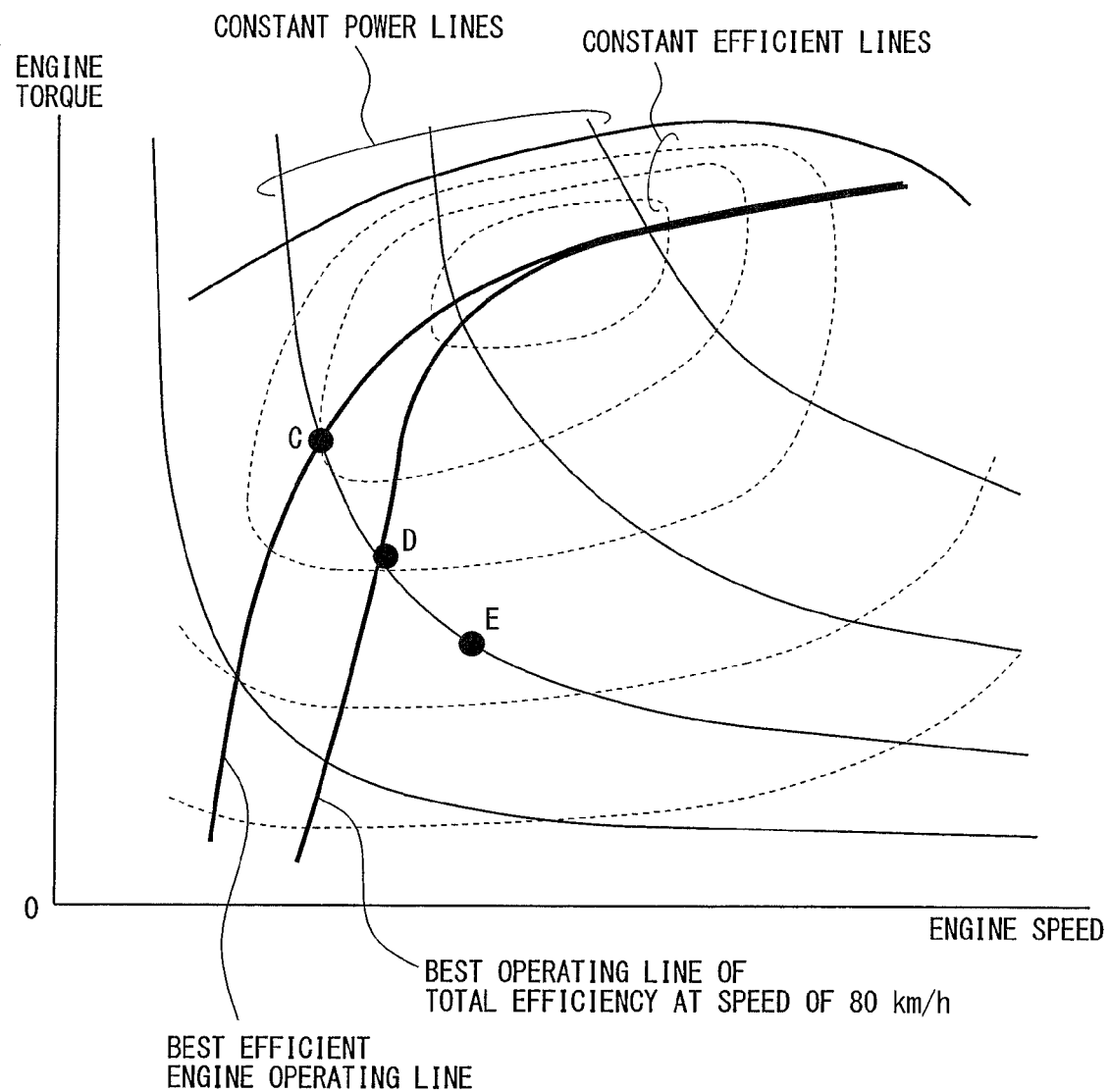
FIG. 7 is an engine characteristic diagram used to describe operating points and operating lines.

Let, for example, the horizontal axis represent engine speed and the vertical axis engine torque as shown in FIG. 7, a family of constant engine power lines takes the form of a set of inverse proportions in graphical representation because the engine power is the product of engine speed and engine torque. The engine characteristic diagram contains a family of constant efficiency lines, each interconnecting constant efficiency points after a function test of the engine. If, for example, for a given engine power as a target, an engine speed and an engine torque, which constitute an operating point considered to provide the most efficient engine operation among all points on the engine power line for the given engine power, are set as an engine speed target Nengt and an engine torque target Tengt, driving with low fuel consumption caused due to at least efficient function operation of the engine may be provided. Connecting these points makes a line of best operation for engine efficiency as shown in FIG. 7. The engine speed target Nengt and engine torque target Tengt which have been set in the above mentioned example are now illustrated as an operating point C.

Figure 8:
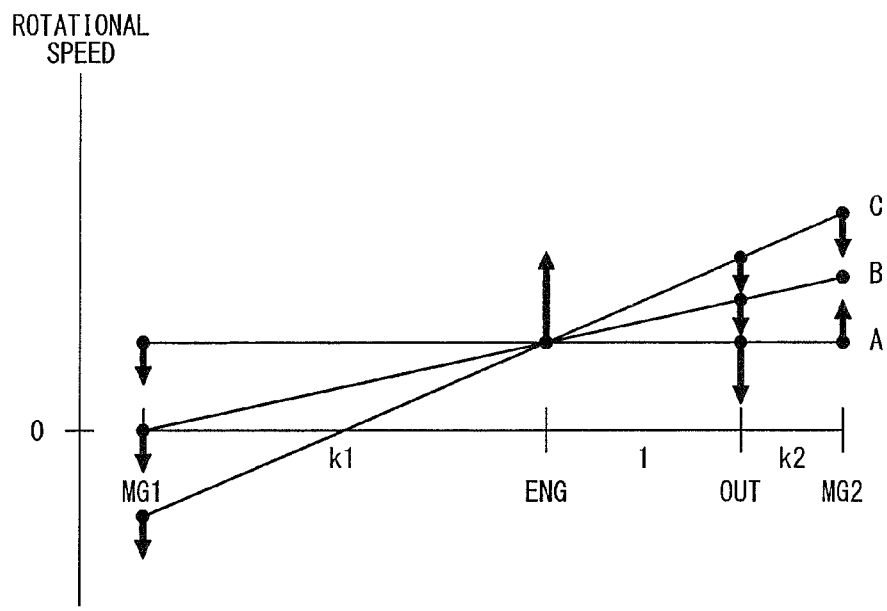
FIG. 8 is a collinear diagram for the power split and composition system in FIG. 1.

With the engine speed target Nengt and the engine torque target Tengt set in this manner and fixed, let the vehicle speed Vc, i.e. the output rotational speed Nout, vary as shown in FIG. 8. In this case, when the vehicle speed Vc is low and the output rotating speed Nout is low alike, both the first motor generator speed Nmg1 and the second motor generator speed Nmg2 are positive, while the first motor generator torque Tmg1 takes on a negative value and the second motor generator torque Tmg2 takes on a positive value, as indicated on a lever A in the collinear diagram in FIG. 8. In this case, the first motor generator 4 operates in generating mode and the second motor generator 5 in motoring mode, but they rotate in the same positive rotational direction, causing no circulation of power (motive power).

Similarly, when the vehicle speed Vc becomes a little higher (40 km/h, for example) and the output rotational speed Nout also becomes a little higher, the first motor generator rotational speed Nmg1 becomes 0, the first motor generator torque Tmg1 becomes negative, the second motor generator rotational speed Nmg2 becomes positive and the second motor generator torque Tmg2 becomes 0 as indicated on a lever B in the collinear diagram shown in FIG. 8 (the same as the state of high gear ratio shown in FIG. 3). There is no circulation of power (motive power) either in this case.

Figure 9:
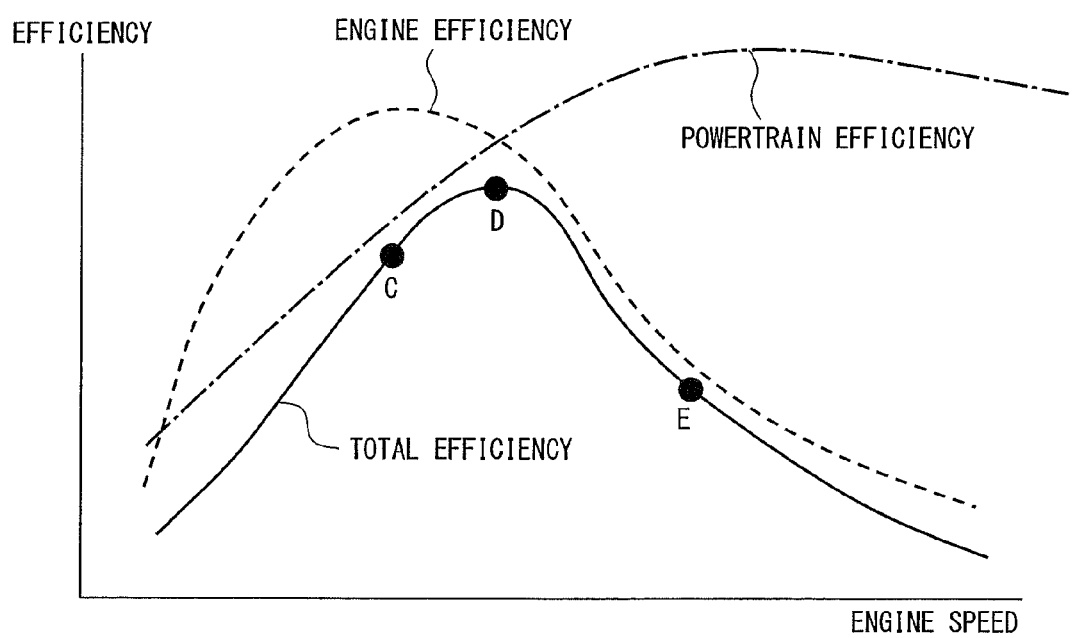
FIG. 9 is an explanatory diagram, showing the relationship between engine speed and efficiency.

However, when the vehicle speed Vc becomes still higher (80 km/h, for example) and the output rotational speed Nout becomes still higher alike, the first motor generator rotational speed Nmg1 becomes negative, the first motor generator torque Tmg1 takes on a negative value, the second motor generator rotational speed Nmg2 takes on a positive value and the second motor generator torque Tmg2 takes on a negative value as indicated on a lever C in the collinear diagram shown in FIG. 8. This state is characterized by operation of the first motor generator 4 in motoring mode in negative direction, operation of the second motor generator 5 in generating mode, causing circulation of power (motive power) and a reduction in powertrain efficiency. As shown in FIG. 9, this reduction in powertrain efficiency causes a reduction in overall efficiency despite the fact that the engine efficiency, so that operating point C is lower in overall efficiency than operating point D.

Figure 10:
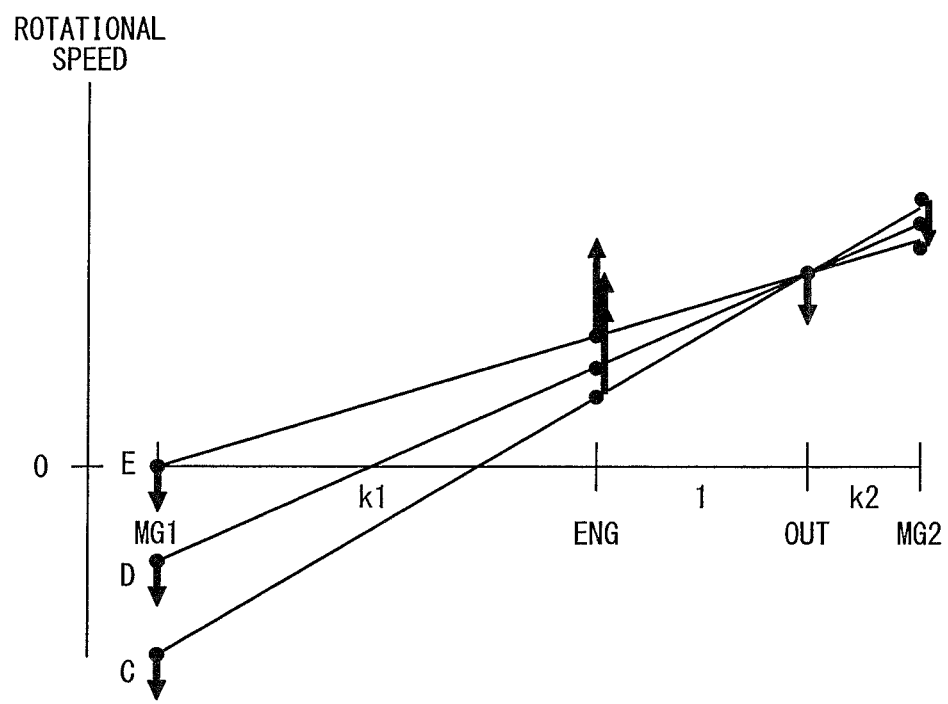
FIG. 10 is a collinear diagram for the power split and composition system in FIG. 1.

Increasing the first motor generator rotational speed Nmg1 to a level equal to or higher than 0, as indicated by a lever E in the collinear diagram shown in FIG. 10, may be considered as one approach to prevent circulation of power during driving at such high speed (80 km/h, for example) but this approach causes an increase in engine speed. Such increase in engine speed also causes a reduction in overall efficiency even though the powertrain efficiency is high as indicated at a point E in FIG. 9.

Figure 11:
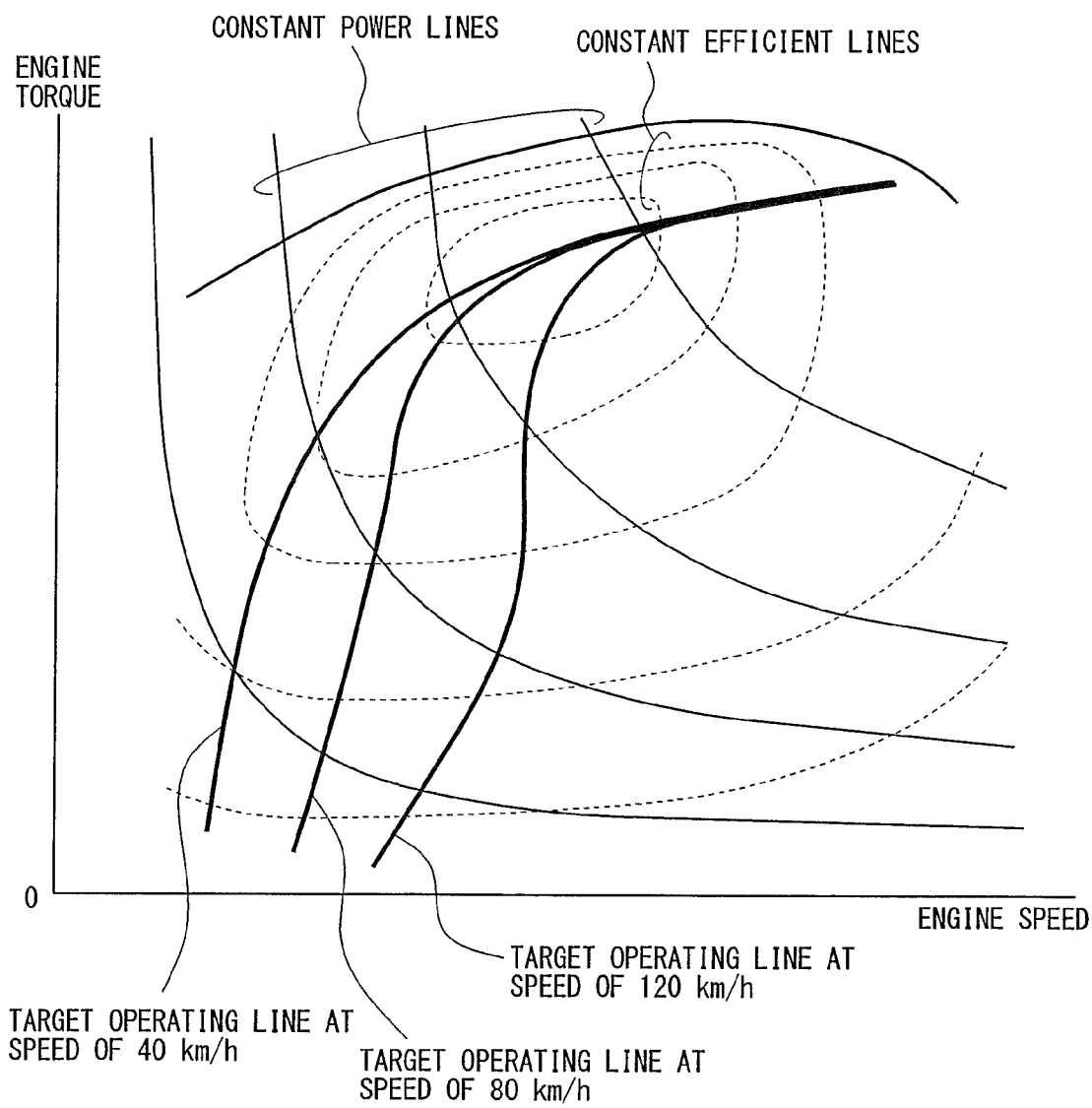
FIG. 11 is an engine characteristic diagram as a control map for operating line retrieval.

Accordingly, setting the engine speed for driving at such high speed (80 km/h, for example) to a point D lying between points C and E shown in FIG. 9 (see a lever D in the collinear diagram shown in FIG. 10), this engine speed at this operating point D is used as an engine speed target Nengt and an engine torque found on the constant power line for the given engine power target against the engine speed target Nengt is used as an engine torque target Tengt. For those reasons, as shown in FIG. 11, when, for example, an engine power target is given, the target operating line for the given engine power target varies in response to the vehicle speed in such a way as to provide the setting that, overall, the higher the vehicle speed Vc, the higher the engine speed target Nengt becomes and the lower the engine torque target Tengt becomes.

In the case of setting such engine speed target Nengt and engine torque target Tengt via discretization in a computer system, control outputs, i.e. engine speed target Nengt and engine torque target Tengt, are considered to change suddenly or frequently in response to a change in each of control inputs read during sampling at regular intervals, causing the engine speed and torque to change suddenly or frequently if such control outputs are actually attained in the engine 2. Accordingly, according to the present embodiment, when the engine operating point target changes, a first order lag filter is used to process the engine speed target Nengt and the variation of the engine speed target Nengt is limited by a predetermined amount of change, restraining the engine speed target Nengt from changing suddenly and frequently. It is possible to alter the predetermined amount of change under certain circumstances.

Figure 12:
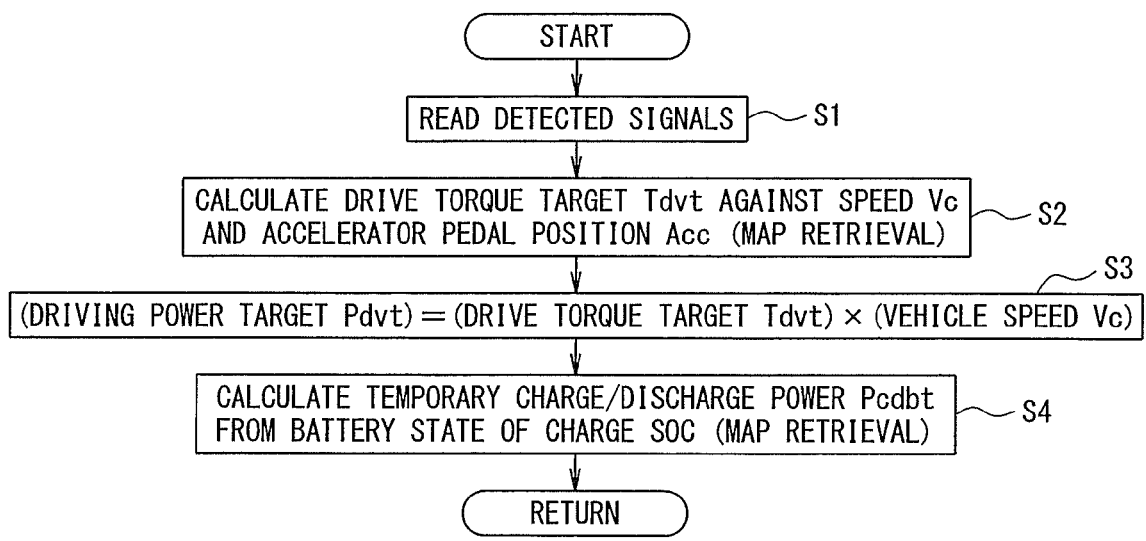
FIG. 12 is a flow chart representing processing performed by a drive-control controller in FIG. 1.

Referring to the flow chart shown in FIG. 12, a routine in said drive-control controller 32 is described, the routine building portions of said drive torque target setting function 37, driving power target setting function 38 and charge/discharge power target setting function 39.

This routine may be executed, for example, in accordance with a processing strategy such as interrupt-driven using a timer to generate periodic interrupts, one upon elapse of a predetermined sampling time (for example, 10 msec.), and it is initiated with reading the detected signals from said accelerator pedal position sensor 33, driving speed sensor 34, engine speed sensor 35 and battery state of charge sensor 36 at step S1.

Figure 13:
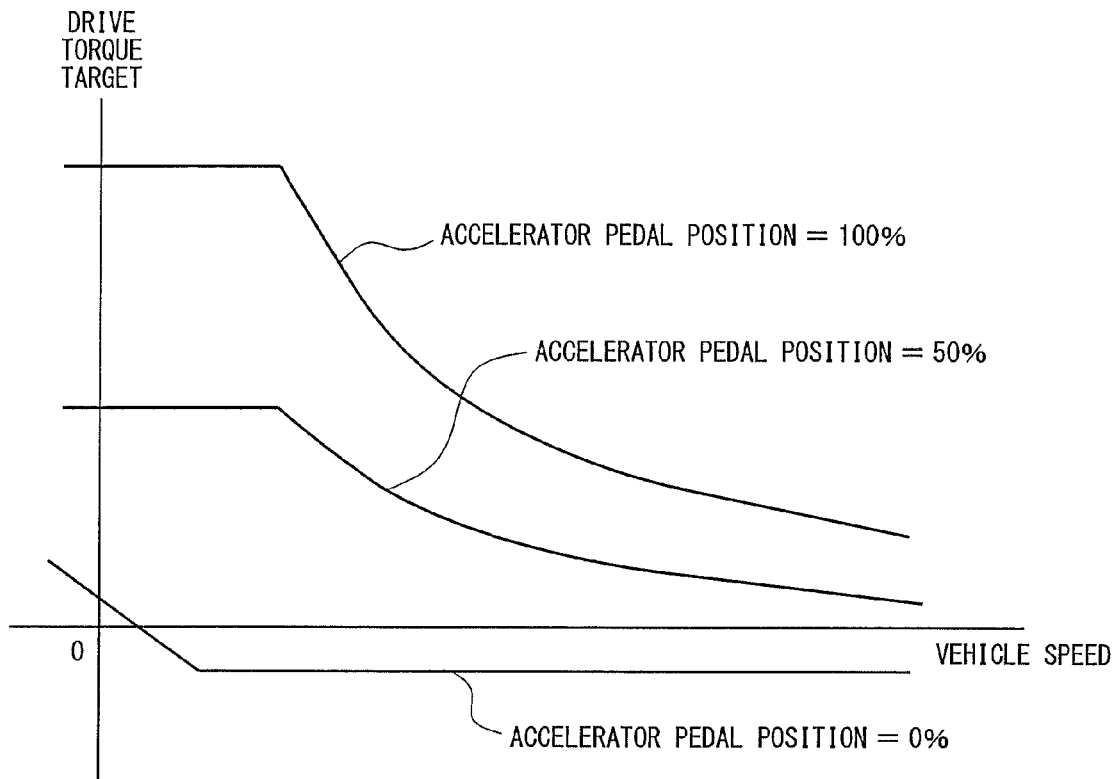
FIG. 13 is a control map used for processing in FIG. 12.

Then, the routine proceeds to step S2, at which a drive torque target Tdvt responsive to the driving speed Vc and the accelerator pedal position Acc is calculated by retrieval of, for example, a map shown in FIG. 13 (constituting the drive torque target setting function 37).

Then, the routine proceeds to step S3, at which a driving power target Pdvt is calculated by multiplying the drive torque target Tdvt that has been calculated at said step S2 by the driving speed Vc (constituting the driving power target setting function 38).

Figure 14:
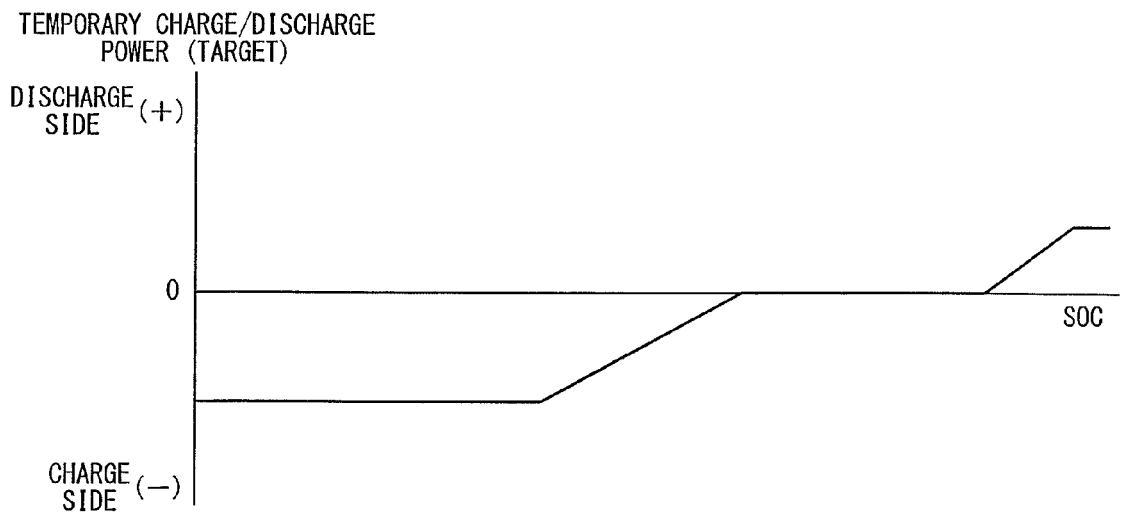
FIG. 14 is a control map used for processing in FIG. 12.

Then, the routine proceeds to step S4, at which a temporary charge/discharge power Pcdbt is calculated by retrieval of, for example, a map shown in FIG. 14 versus the battery state of charge SOC before returning to the main program.

Figure 15:
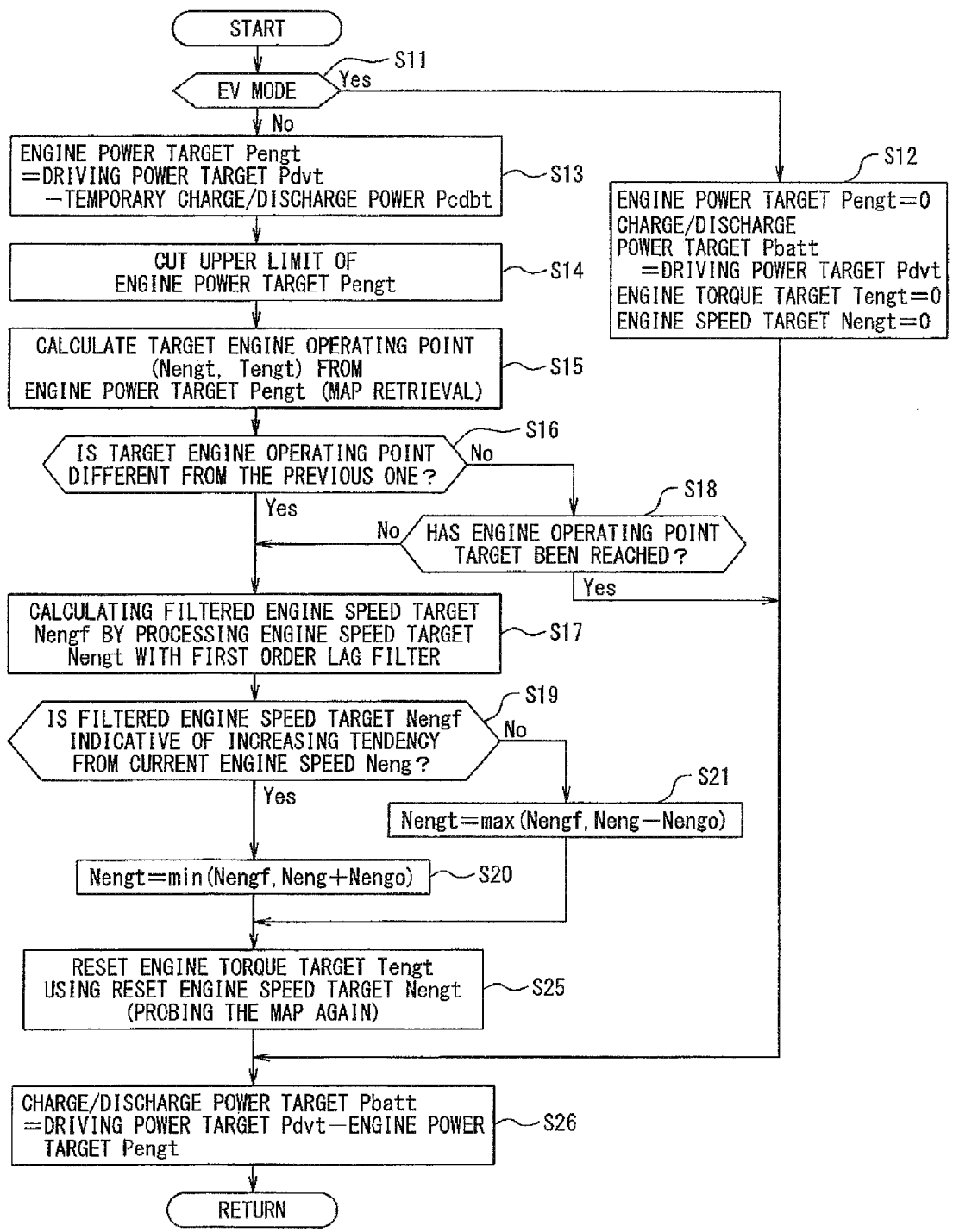
FIG. 15 is a flow chart representing processing performed by the drive-control controller in FIG. 1.

Referring to the flow chart shown in FIG. 15, a routine in said drive-control controller 32 is described, the routine building said charge/discharge power target setting function 39, engine power target setting function 40 and engine control function 41. This routine may be executed immediately after execution of the routine shown in FIG. 12, for example, in accordance with a processing strategy such as interrupt-driven using a timer to generate periodic interrupts, one upon elapse of a predetermined sampling time (for example, 10 msec.); and it is initiated with determining at step S11 whether or not the vehicle operates in a drive mode where only one or both of first motor generator 4 and second motor generator 5 drive the vehicle (indicated at "EV drive" in the figure, hereinafter called "motor-generator drive mode"); and the routine proceeds to step S12 if the vehicle operates in motor-generator drive mode or otherwise the routine proceeds to step S13. Drive mode, in which only one or both of first motor generator 4 and second motor generator 5 are activated, i.e. motor-generator drive mode, is established when engine power target Pengt is 0, for example, when battery 21 is almost fully charged, so that temporary charge/discharge power Pcdbt calculated based on battery state of charge SOC is greater than or equal to driving power target Pdvt or when, with accelerator pedal released, the vehicle creeps or coasts or decelerates unless battery 21 is almost fully charged.

At said step S12, the vehicle is in motor-generator drive mode, so that engine power target Peng is set to 0, charge/discharge power target Pbatt to driving power target Pdvp, engine torque target Tengt to 0 and engine speed target Nengt to 0, respectively, before the routine returns to the main program. Even in such a case, a filter may be used to process engine speed Neng by limiting the amount of change in engine speed target Nengt.

On the other hand, at said step S13, engine power target Pengt is calculated by subtracting temporary charge/discharge power Pcdbt that is calculated at step S4 from driving power target Pdvt that is calculated at said step S3 (constituting engine power target setting function 40).

Next, the routine proceeds to step S14 at which engine power target Pengt is subject to upper limit cut-off process (constituting engine power target setting function 40). This upper limit is the maximum of engine power which engine 2 can provide.

Next, the routine proceeds to step S15 at which that engine power target Pengt which has been subject to upper limit cut-off process at step S14 is used for retrieval of a map shown in FIG. 11 to calculate target engine operating point, i.e. engine speed target Nengt and engine torque target Tengt (hereinafter, constituting engine control function 41).

Next, the routine proceeds to step S16 at which it is determined whether or not the current target engine operating point found at said step S15 is different from the previous target engine operating point found in the previous processing, and the routine proceeds to step S17 if the current target engine operating point is different from the previous one or otherwise the routine proceeds to step S18.

At step S18, the current target engine operating point found at said step 15 is the same as the previous one found in the previous processing, so that it is determined whether or not the target engine operating point has been reached, and the routine proceeds to step S26 if the target operating point has been reached or otherwise the routine proceeds to said step S17.

At said step S17, the engine speed target Nengt calculated at said step S15 is processed using a first order lag filter as expressed in the following equation (7) to calculate an engine speed filtered target Nengf before the routine proceeds to step S19. In the equation, $\alpha$ is the predetermined coefficient.

$$Nengf=(Nengt-Neng)\times\alpha+Neng \quad (7)$$

At said step S19, it is determined whether or not the engine speed filtered target Nengf calculated at said step S17 shows a tendency to increase from the current engine speed Neng, and the routine proceeds to step S20 when the engine speed filtered target Nengf shows the tendency to increase from the current engine speed Neng or otherwise to step S21.

At said step S20, the engine speed target Nengt is set to that one of the engine speed filtered target Nengf calculated at said step S17 and the sum of the current engine speed Neng and a predetermined engine speed variation Neng0 which is less, and the routine proceeds to step S25.

The engine speed filtered target Nengf calculated at said step S17 increases as the deviation of the engine speed target Nengt from the current engine speed Neng increases. Therefore, at this step S20, the engine speed target Nengt is set to the sum of the predetermined engine speed variation Neng0 and the current engine speed Neng when this sum is less than the filtered engine speed target Nengf, holding the variation in engine speed target less than or equal to a predetermined amount of variation. On the other hand, the engine speed target Nengt is set to the engine speed filtered target Nengf when the sum of the predetermined engine speed variation Neng0 and the current engine speed Neng is not less than the engine speed filtered target Nengf, causing the present engine speed Neng to gradually approach the engine speed target Nengt when the current engine speed Neng is sufficiently near the engine speed target Nengt. This prevents the vehicle driver from feeling uncomfortable.

At said step S21, the engine speed target Nengt is set to that one of the engine speed filtered target Nengf calculated at said step S17 and the subtraction of the predetermined engine speed variation Neng0 from the current engine speed Neng which is great, and the routine proceeds to step S25.

The engine speed filtered target Nengf calculated at said step S17 decreases as the deviation of the engine speed target Nengt from the current engine speed Neng increases. Therefore, at this step S21, the engine speed target Nengt is set to the subtraction of the predetermined engine speed variation Neng0 from the current engine speed Neng when this subtraction is greater than the filtered engine speed target Nengf, holding the variation in engine speed target less than or equal to a predetermined amount of variation. On the other hand, the engine speed target Nengt is set to the engine speed filtered target Nengf when the subtraction of the predetermined engine speed variation Neng0 from the current engine speed Neng is not greater than the engine speed filtered target Nengf, causing the present engine speed Neng to gradually approach the engine speed target Nengt when the current engine speed Neng is sufficiently near the engine speed target Nengt. This prevents the vehicle driver from feeling uncomfortable.

At said step S25, engine torque target Tengt is reset by probing again the map shown in FIG. 11 using the engine speed target Nengt that has been reset at said step S20 or step S21.

Next, the routine proceeds to step S26 at which charge/discharge power target Pbatt is calculated by subtracting engine power target Pengt from driving power target Pdvt before it returns to the main program.

In addition, engine control function 41 controls conditions of air intake via mass air flow adjustment unit 10, conditions of admission of fuel via fuel admission system 11 and conditions of igniting fuel via ignition manager 12 in order to achieve the engine speed target Nengt and engine torque target Tengt which have been set.

Figure 16:
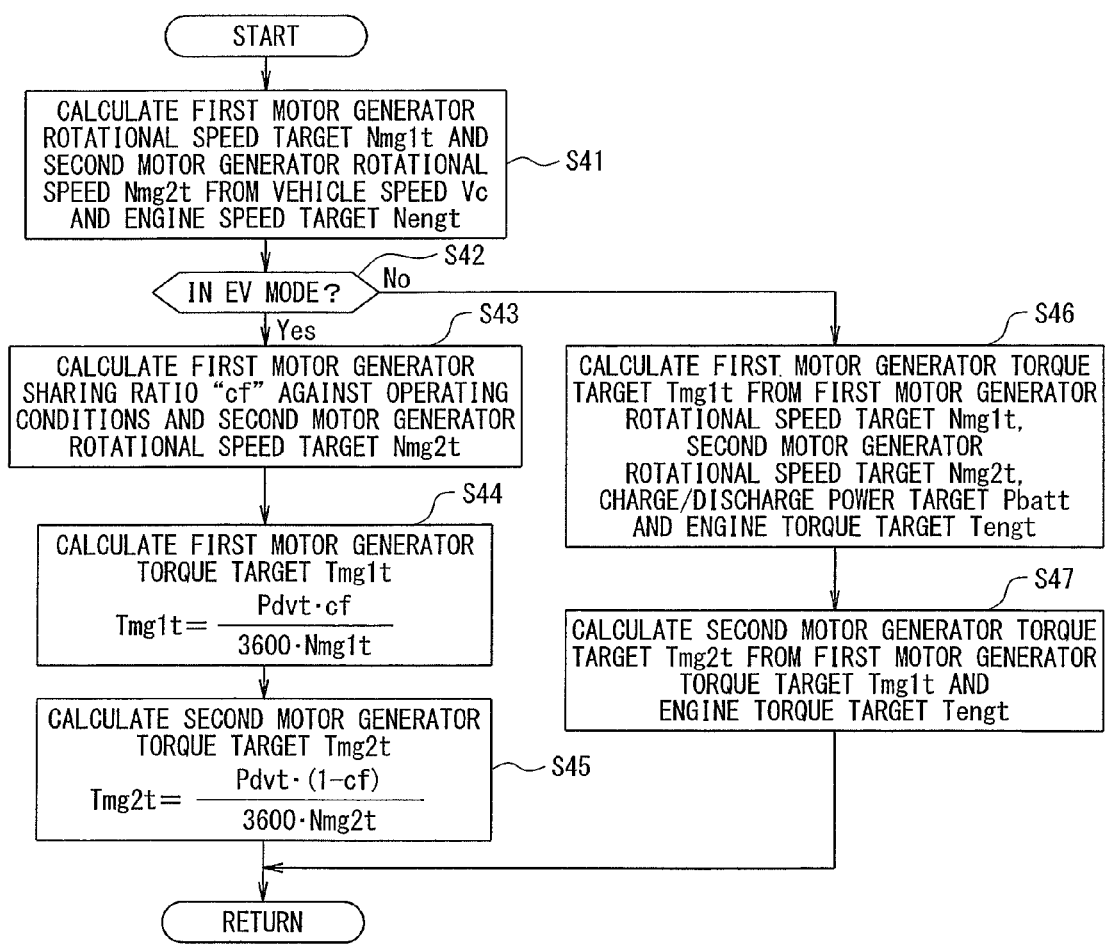
FIG. 16 is a flow chart representing processing performed by the drive-control controller in FIG. 1.

Referring to the flow chart shown in FIG. 16, a routine in said drive-control controller 32, which constitutes said motor generator control function 42, is described. This routine may be executed immediately after execution of the routine shown in FIG. 15, for example, in accordance with a processing strategy such as interrupt-driven using a timer to generate periodic interrupts, one upon elapse of a predetermined sampling time (for example, 10 msec.); and it is initiated with calculating at step S41 a first motor-generator speed target Nmg1t and a second motor-generator speed target Nmg2t from the vehicle speed Vc and the engine speed target Nengt. For this calculation, the following equations 1' and 2', which are derived from said equations 1 and 2, respectively, are used. As described before, the output rotational speed Nout that is used in the equations is derived from the vehicle speed Vc, the final reduction ratio and the reduction ratio of output gearing 31.

$$Nmg1t=(Nengt-Nout)\times k1+Nengt \quad (1')$$

$$Nmg2t=(Nout-Nengt)\times k2+Nout \quad (2')$$

Next, the routine proceeds to step S42 in which it is determined whether or not the vehicle operates in said motor-generator drive mode ("EV drive" in the figure), and the routine proceeds to step S43 if the vehicle operates in motor-generator drive mode or otherwise the routine proceeds to step S46. The determination whether the vehicle operates is in the motor generator drive mode is made, as the processing at step S11 shown in said FIG. 15.

At step S43, the first motor generator sharing ratio "cf" is set in response to driving conditions of the vehicle and second motor generator rotational speed target Nmg2t as described before, and the routine proceeds, next, to step S44.

At step S44, first motor generator torque target Tmg1t is calculated, in accordance with the following equation 9, from driving power target Pdvt, first motor generator sharing ratio "cf" and first motor generator rotational speed target Nmg1t, before the routine proceeds to step S45.

$$Tmg1t=(Pdvt \times cf)/(3600 \times Nmg1t) \qquad (9)$$

At step S45, second motor generator torque target Tmg2t is calculated, in accordance with the following equation 10, from driving power target Pdvt, first motor generator sharing ratio "cf" and second motor generator rotational speed target Nmg2t, before the routine returns to the main program.

$$Tmg2t=(Pdvt \times (1-cf))/(3600 \times Nmg2t) \qquad (10)$$

On the other hand, at step S46, first motor generator torque target Tmg1t is calculated, in accordance with the following equation 11, from first motor generator rotational speed target Nmg1t, second motor generator rotational speed target Nmg2t, charge/discharge power target Pbatt and engine torque target Tengt before the routine proceeds to step S47. The following equation 11 is derived from modifying the simultaneous equations 3 and 4.

$$Tmg1t=(Pbatt \times 60/2\pi - Nmg2t \times Tengt/k2)/(Nmg1t + Nmg2t \times (1+k1)/k2) \qquad (11)$$

At step S47, second motor generator torque target Tmg2t is calculated, in accordance with the following equation 12, from first motor generator torque target Tmg1t and engine torque target Tengt, before the routine returns to the main program. The following equation 12 is derived from said equation 3.

$$Tmg2t=(Tengt+(1+k1) \times Tmg1t)/k2 \qquad (12)$$

According to the routine shown in said FIG. 12, drive torque target Tdvt, which reflects driver demand and driving condition, is set in accordance with vehicle speed Vc and accelerator pedal position Acc, driving power target Pdvt is calculated by multiplying the drive torque target Tdvt and the vehicle speed Vc, and, on the other hand, temporary charge/discharge power Pcdbt, which corresponds to the state of charge SOC of battery 21, is set.

Turning, now, to the routine shown in said FIG. 15, in the event of the vehicle not travelling in the motor generator drive mode, engine power target Pengt is calculated by subtracting temporary charge/discharge power Pcdbt from driving power target Pdvt, and engine speed target Nengt and engine torque target Tengt are calculated by probing the map illustrated in said FIG. 11 using engine power target Pengt that has been subject to upper limit cut-off process. In the event that this engine operating point target is the same as that found in the previous processing or the engine operating point target found in the previous processing has been reached, charge/discharge power target Pbatt is calculated by subtracting engine power target Pengt, which has been subject to upper limit cut-off process, from driving power target Pdvt. Engine operating conditions to realize good vehicle overall efficiency may be realized upon achieving engine speed target Nengt and engine torque target Tengt by letting the engine control function 41 control conditions of air intake via mass air flow adjustment unit 10, conditions of admission of fuel via fuel admission system 11 and conditions of igniting fuel via ignition manager 12.

Since, under the above-mentioned operating conditions, the engine 2 is operating, the routine shown in FIG. 16 proceeds from step S41 to step S46; and first motor generator rotational speed target Nmg1 and second motor generator rotational speed target Nmg2t are set in response to vehicle speed Vc and engine speed target Nengt. At step S46 and step S47, first motor generator torque target Tmg1t and second motor generator torque target Tmg2t are set so that they may satisfy the torque balance equation expressed by said equation (3) and the electricity balance equation expressed by said equation (4). Therefore, the motor generator control function 42 controls first inverter 19 and second inverter 20, causing first motor generator 4 to turn at first motor generator rotating speed target Nmg1 to generate torque at first motor generator torque target Tmg1t, causing second motor generator 5 to turn at second motor generator rotating speed target Nmg2 to generate torque at second motor generator torque Tmg2t. This realizes operating conditions of the motor generators with good torque balance and electricity balance and with good overall vehicle efficiency.

On the contrary, under the operating conditions of the vehicle when the engine 2 is not in motion, since the motor generator drive mode is selected, only one or both of first motor generator 4 and second motor generator 5 are required to drive the vehicle. As engine power target Pengt at this time is 0, one of or both of first motor generator 4 and second motor generator 5 are required to compensate driving power target Pdvt in its entirety. In this case, responsive to vehicle operating conditions and second motor generator rotational speed target Nmg2t, first motor generator sharing ratio "cf" is set, so that, using this ratio, first motor generator torque target Tmg1t and second motor generator torque target Tmg2t are calculated and set at step S44 and step S45. Therefore, the motor generator control function 42 controls first inverter 19 and second inverter 20, causing first motor generator 4 to turn at first motor generator rotating speed target Nmg1 to generate torque at first motor generator torque target Tmg1t, causing second motor generator 5 to turn at second motor generator rotating speed target Nmg2 to generate torque at second motor generator torque Tmg2t. This realizes operating conditions of the motor generators with good torque balance and electricity balance and with good efficiency in motor generator drive mode.

Figure 17:
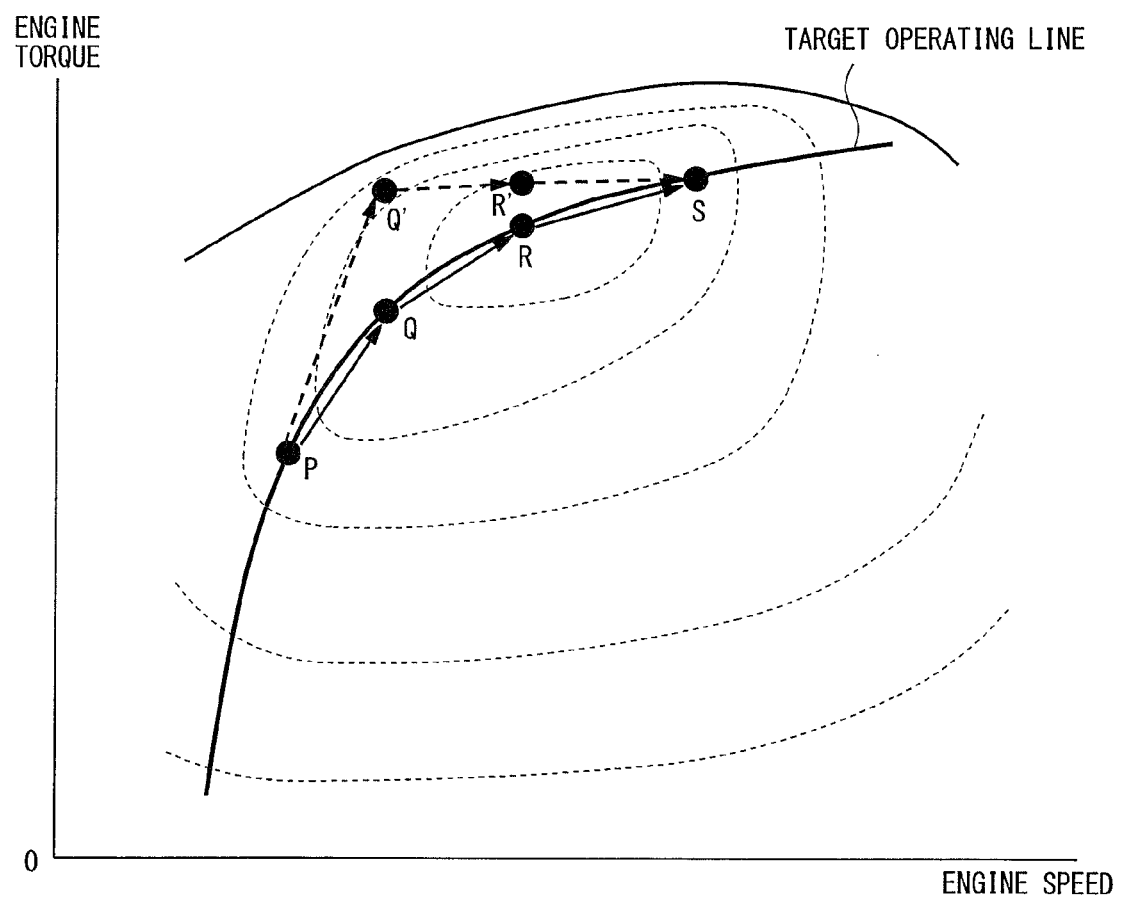
FIG. 17 is an engine characteristic diagram describing the operation of the processing shown in FIG. 15.

On the other hand, with engine 2 in motion, in the event that the target engine operating point on the efficient target operating line found on the control map is different from the previous target engine operating point found in the previous processing or even though the engine operating point target is the same as that found in the previous processing, it is not reached yet, the amount of change in the engine speed target Nengt is limited by the predetermined amount of change in engine speed Neng0. Resetting, in this manner, the engine speed target Nengt, the engine torque target Tengt is reset from the same target operating line that has been selected by the engine power target Pengt using the reset engine speed target Nengt. It follows that, with reference, for example, to FIG. 17, assuming that the point P is the current engine operating point on the target operating line, the point S is the target engine operating point Pengt, and a difference in engine speed Neng between them is greater than predetermined amount of change in engine speed Neng0, engine speed target Nengt is limited by the predetermined amount of change in engine speed Neng0, and so the engine operating point reaches the point S, which is the target engine operating point, via point Q and point R as shown in FIG. 17. Since, in this case, engine operating points are all on the target operating line, the engine is efficient in operation and excellent in fuel consumption.

By contrast, the engine torque achieved remains as high as the engine torque target Tengt for the target engine operating point S even though a change in engine speed Neng is limited to assume values as indicated by points Q' and R' in FIG. 17 if, after the engine speed target Nengt and engine torque target Tengt have been set for the target engine operating point S, only the engine speed target Nengt is limited by the predetermined amount of change in engine speed Neng0. Consequently, fuel consumption is bad because the engine operating points, as indicated at Q' and R' in FIG. 17, are deviated from the efficient operating line.

According to the embodiment of a drive control apparatus for a hybrid electric vehicle, operations of the engine 2, first motor generator 4 and second motor generator 5 are controlled by limiting a change in engine speed target Nengt to a predetermined amount of change in engine speed Neng0 upon making a change in engine speed target Nengt and setting an engine torque target Tengt versus an engine speed target Nengt involving the limited change based on a target operating line determined beforehand. Consequently, this restrains or prevents sudden or frequent changes in engine speed Neng with the efficiency kept high.

Moreover, an engine power target Pengt is calculated from a driving power target Pdvt required for a vehicle and a target engine operating point expressed by a set of an engine speed target Nengt and an engine torque target Tengt is found on a target operating line determined in response to the engine power target Pengt. When the found target engine operating point is different from the previously found target engine operating point, a change in engine speed target Nengt is limited to a predetermined amount of change in engine speed Neng0 and the engine torque target Tengt of the set is reset versus an engine speed target Nengt involving the limited change based on the determined target operating line. Consequently, the engine power target Pengt and thus the driving power target Pdvt are ensured so as to restrain or prevent sudden or frequent changes in engine speed Neng with the efficiency kept high.

The form of connecting the four rotating elements (shafts) in the power split and composition system is not limited to one described above, and variations as various forms of connection as mentioned in said JP Patent No. 3852562 which the applicant previously proposed. According to the drive control apparatus for hybrid electric vehicle of the present invention, hybrid electric vehicles with such variations can obtain the same operation and effect.

Furthermore, the form of a drive control for an engine, first and second motor generators is not limited to the one described above, it is possible to use various kinds of forms of hybrid control systems, and the drive control apparatus of the present invention can obtain the same operation and effect in the drive mode in which the engine and motor generators operate concurrently.

Furthermore, the drive control apparatus for hybrid vehicle of the present invention can obtain the same operation and effect on the hybrid vehicles with onboard motors which do not function as generators as well as an engine. In this case, the number of the onboard motors should be more than one.

DESCRIPTION OF NOTATIONS 1 is the one-way clutch; 2 the engine; 3 the engine output shaft; 4 the first motor generator; 5 the second motor generator; 6 the traction wheel; 7 the traction shaft; 8 the first planetary gear set; 9 the second planetary gear set; 19 the first inverter; 20 the second inverter; 21 the battery; 32 the drive-control controller (drive control function); 37 the drive torque target setting function; 38 the driving power target setting function; 39 the charge/discharge power target setting function; 40 the engine power target setting function; 41 the engine control function; and 42 the motor generator control function.

The invention claimed is:

1. A hybrid electric vehicle control apparatus, for use with a vehicle driven by an output of an engine and an output of an electric motor operable on power supplied by a battery, comprising:
   an accelerator pedal position sensor detecting a position of an accelerator pedal;
   a driving speed sensor detecting a vehicle speed;
   a battery state of charge sensor detecting a state of charge of the battery; and
   a drive-control controller which controls the engine and the electric motor, wherein the drive-control controller is configured to set a driving power target in response to a detected position of the accelerator pedal and a detected vehicle speed, to set a charge/discharge power target in response to a detected state of charge of the battery, to calculate an engine power target based on the driving power target and the charge/discharge power target, and to calculate an engine speed target based on the engine power target and a stored map, and wherein the engine speed target calculated by the drive-control controller is limited by a predetermined restricting value such that a change in the engine speed target does not exceed the predetermined restricting value, and
   wherein the drive-control controller is further configured to set an engine torque target based on the stored map and the engine speed target calculated by the drive-control controller and limited by the predetermined restricting value.

2. The hybrid electric vehicle drive control apparatus according to claim 1, wherein:
   said drive-control controller is configured to calculate the engine power target from the driving power target required for the vehicle, and to determine a target operating line in response to the engine power target; and
   said drive-control controller is configured to determine a target engine operating point, which is expressed by a set of the engine speed target and the engine torque target, on said determined target operating line determined in response to said engine power target, and wherein said drive-control controller limits a change in the engine speed target to a predetermined amount of change corresponding to the predetermined restricting value when said target engine operating point is different from the previously found target engine operating point, and resets the engine torque target of the set versus an engine speed target having the limited change based on said determined target operating line.

3. A hybrid electric vehicle comprising:
   an engine;
   a battery;
   an electric motor operable on power supplied by the battery; and
   a drive control apparatus comprising:
   an accelerator pedal position sensor detecting a position of an accelerator pedal;
   a driving speed sensor detecting a vehicle speed;

a battery state of charge sensor detecting a state of charge in the battery; and a drive-control controller which controls the engine and the electric motor, wherein the drive-control controller is configured to set a driving power target in response to a detected position of the accelerator pedal and a detected vehicle speed, to set a charge/discharge power target in response to a detected state of charge of the battery, to calculate an engine power target based on the driving power target and the charge/discharge power target, and to calculate an engine speed target based on the engine power target and a stored map, and wherein the engine speed target calculated by the drive-control controller is limited by a predetermined restricting value such that a change in the engine speed target does not exceed the predetermined restricting value, and wherein the drive-control controller is further configured to set an engine torque target based on the stored map and the engine speed target calculated by the drive-control controller and limited by the predetermined restricting value.

4. The hybrid electric vehicle according to claim 3, wherein the hybrid electric vehicle further comprises:

a power split and composition system with four shafts in driving connection with rotating elements of each of two planetary gear sets;

another electric motor, and wherein said electric motor and said another electric motor are coupled to the battery;

wherein said four shafts of the power split and composition system are connected to said another electric motor, said engine, a traction shaft connected to a traction wheel and said motor, respectively, so that said another electric motor, said engine, said traction shaft and said electric motor are arranged in this order on a collinear diagram from one side thereof; and wherein said drive-control controller is configured to control operation of said engine in response to said engine power target and controls operation of said electric motor and said another electric motor in response to a charge/discharge power target determined by subtracting the engine power target from said driving power target.

* * * * *